United States Patent [19]
Marshall

[11] Patent Number: 6,042,759
[45] Date of Patent: *Mar. 28, 2000

[54] METHOD OF MAKING MOLDED ORTHOTICS

[76] Inventor: Scott Marshall, 27510 N. Ave. Mentry, Valencia, Calif. 91355

[*] Notice: This patent is subject to a terminal disclaimer.

[21] Appl. No.: 09/045,658

[22] Filed: Mar. 20, 1998

Related U.S. Application Data

[63] Continuation-in-part of application No. 08/699,393, Aug. 19, 1996, Pat. No. 5,746,952.

[51] Int. Cl.[7] .............................. B29L 31/50; G01B 7/28
[52] U.S. Cl. ...................... 264/40.1; 264/222; 264/227; 264/320; 12/146 L; 36/93
[58] Field of Search ............................. 264/40.1, 219, 264/220, 222, 225, 227, 328.1, 299, 319, 320, 325; 12/142 N, 146 L; 36/88, 93, 140, 154

[56] References Cited

U.S. PATENT DOCUMENTS

| | | |
|---|---|---|
| 3,121,431 | 2/1964 | Rosenhaft . |
| 3,320,347 | 5/1967 | Greenwalt . |
| 3,995,002 | 11/1976 | Brown . |
| 4,412,364 | 11/1983 | Orea Mateo . |
| 4,522,777 | 6/1985 | Peterson . |
| 4,702,255 | 10/1987 | Schenkl . |
| 4,817,222 | 4/1989 | Shafir . |
| 4,868,945 | 9/1989 | DeBettignies . |
| 4,876,758 | 10/1989 | Rolloff et al. . |
| 5,054,148 | 10/1991 | Grumbine . |
| 5,586,067 | 12/1996 | Gross et al. . |
| 5,746,952 | 5/1998 | Marshall . |
| 5,879,725 | 3/1999 | Potter . |

*Primary Examiner*—Jill L. Heitbrink
*Attorney, Agent, or Firm*—James E. Brunton, Esq.

[57] ABSTRACT

A method of making functional orthotics from a multiplicity of uniquely designed injection molds which have been constructed by studying large numbers of replicas produced from uncorrected replicas that replicate the contour of the feet of a multiplicity of patients. In one form of the method of the invention, following a careful dimensional study of the corrected replicas, they are grouped into families, the members of which exhibit lower surface contours that are substantially identical. An injection mold is then made for each of the identified families, in a manner such that the mold will produce an orthotic having an upper surface that corresponds to the lower surface of the corrected orthotic that make up the group. Companion data is then developed which correlates the corrected replicas of each identified family with the uncorrected replicas from which they were made. A study of the uncorrected replicas then provides data as to the contour of the patient's feet which they replicate. This data can then be compared with new patient data provided by the prescribing doctor and the mold can be selected which will produce and injection molded orthotic which is appropriate for the particular patient.

24 Claims, 5 Drawing Sheets

METHOD OF MAKING MOLDED ORTHOTICS

This is a Continuation-In-Part application of application Ser. No. 08/699,393 filed Aug. 19, 1996 now U.S. Pat. No. 5,746,952.

BACKGROUND OF THE INVENTION

1. Field of the Invention

The present invention relates generally to orthopedic appliances. More particularly, the invention concerns a novel method for making finished functional orthotics by using various critical measurements made of the patient's feet.

2. Discussion of the Prior Art

Orthopedic appliances, or foot supports, having various shapes and configurations have been known for many years. The prior art appliances range from simple foam, leather, cork, or sponge rubber arch supports that can be purchased in drugstores to sophisticated, custom-fitted orthotics formed of various rigid or semirigid materials. These latter devices, while much more effective than the former, are typically quite expensive and are generally constructed by orthopedic laboratories in accordance with detailed prescriptions provided by the examining doctor.

Generally speaking, the primary function of an orthotic is to correctly limit the complex motions of excessive pronation and supination. Pronation may be simply described as the flattening or rolling inward of the foot as the foot strikes the ground as during walking or running. Excessive pronation can cause the tibia and fibula to rotate inwardly sometimes placing severe strain on the leg muscles. Supination, on the other hand, is the rolling outward of the foot during walking or running. When either of these motions become excessive, painful damage to the knees, ankles and feet can occur.

In making the more sophisticated functional orthotics, the conventional practice, which has remained essentially unchanged for many years, is to first make an impression of the patient's foot. This impression, which may be made in plaster of paris or in a crushable, foam-like material, is forwarded to the orthopedic laboratory along with the examining doctor's instructions. One method of making the impression, or negative depression, using foam blocks is described in U.S. Pat. No. 3,320,347 issued to Greenawalt. This method, as described by Greenawalt, comprises placing a foam block on the floor, centering one of the patient's feet relative to the block and then having the patient stand so that his weight is equally divided on both feet. As the patient's weight is placed on the foam block, the foam cells of the block will be crushed and a negative impression of the patient's foot will be created.

The thrust of the Greenawalt method is to use the impression made in the crushable foam block to make various measurements, visual observations and touch evaluations which serve as the basis for constructing the corrective arch support. For example, measurements are made of the length and width of the impression and observations of the position of the metatarsal heads, of plantar abnormalities in the inner and outer longitudinal arch and of the presence and degree of supination are made. These measurements and observations are then used in laying out the dimensions and sizes of the leather blanks which are to be used for constructing the corrective arch support.

Another prior art approach followed by many orthopedic laboratories in constructing functional orthotics involves pouring a solution of plaster of paris into the impression, or negative depression, to make an uncorrected replica or cast of the patient's foot. This having been done, the uncorrected replica which provides an exact duplication of the contours of the lower surface of the patient's foot, is corrected in the manner prescribed by the examining doctor. For example, the uncorrected replica is often wedged or adjusted to simulate the position of the foot in the neutral position or in the position which the doctor wishes to control foot function. The neutral position of the foot is the position wherein the foot is neither supinated nor pronated and the midtarsal joint is maximally pronated. In this neutral position, the foot typically transfers force most effectively. In biomechanical terms the foot must ideally absorb the force of gravity at heel contact and then create a rigid lever to correctly propel the body forward for the next step. When the foot is not in or near the neutral position, it cannot absorb force nor can it create an effective lever for propelling the body forward in a proper manner. Such a problem can cause the foot structure to break down and, over time, lead to severe neck pain, back pain, foot pain, bunions, heel spurs, and the like.

The wedging step involves first bisecting the posterior aspect of the calcaneus and then wedging the cast until this bisection is generally perpendicular to the horizontal plane. The wedging, per se, is generally accomplished by adding a plaster forefoot platform to the cast. Preferably, the platform extends from about one centimeter proximal to the first metatarsal head and the fifth metatarsal head to the sulcus area and spans the positive mold from the medial aspect (outside edge of first toe) to the lateral aspect (outside edge of fifth toe).

Typically, the wedged mold is then further modified with a plaster of paris buildup to account for fat pad expansion around the heel and along the lateral foot border, to allow for compression of the medial arch and transverse arch, and to create a smooth transition from the forefoot platform to the arch and midfoot.

It is apparent from the foregoing that the method for correcting the uncorrected replica is a complex, time-consuming, and highly labor intensive operation. Further, the prior art method is somewhat imprecise and is highly dependent on the skill of the particular technician involved.

Although the same basic principles are used by the laboratory technician to correct the uncorrected replica formed from the impression of the patient's foot, experience has shown that no two people will correct a particular replica in exactly the same way. Thus, if two identical uncorrected replicas were to be sent to two different orthopedic laboratories, the orthotic returned to the doctor would be different in various respects. This is because the laboratory technician who makes the corrections is of necessity required to make various subjective decisions based upon his own experience and capabilities. For example, no two feet are the same length and width, even on the same patient. Nevertheless the examining doctor, or other licensed professional, typically wants the two orthotics made for the same patient to look symmetrical. Accordingly, the technician is forced to subjectively judge where the forefoot platforms should be located and how much expansion should be placed on each foot. No two technicians or laboratories will make the same decisions in the same way.

Further contributing to the impreciseness of the prior art techniques for making functional orthotics is the method of forming the orthotic from the corrected replica. Basically, this method involved thermal forming of a layer of polyolefin plastic sheet over the lower surface of the corrected replica. If the forming step is correctly done and the polyolefin sheet is properly heated and cooled, the upper surface of the sheet will correspond substantially to the lower surface of the corrected replica. One such method of thermal forming is described in U.S. Patent No. 4,702,255 issued to Schenkel. However, if the forming step is incorrectly done, precise replication of the lower surface of the corrected replica will not result.

For the foregoing reasons, the products made by different laboratories are somewhat different and even the corrections made within a single laboratory may be different from foot to foot. Further contributing to deficiencies in prior art orthotics is the absence of reliable methods for analyzing the patient's foot impressions and the inability of a given orthotic constructed from the impression to, in fact, properly control the patient's foot.

From an exhaustive study made by the present inventor of literally thousands of orthotics made in accordance with the prior art processes discussed in the preceding paragraphs, a most surprising discovery was made. Since the conventional wisdom has been that the foot of each patient is unique with no two feet being alike, those working in the field have presumed that no two orthotics made by the previously discussed prior art process would be alike. Surprisingly, the studies made by the present inventor indicate that this, in fact, is not the case. These studies included the careful measurement of the contour of each of a large number of uncorrected replicas presented for correction followed by the careful measurement of the corrected contour of each corrected replica produced in the laboratory in accordance with the processes described in the preceding paragraphs. An analyses of the measurements showed that, while the uncorrected replicas typically varied in certain respects, many of the corrected replicas and the orthotics formed therefrom were nearly functionally identical and fell into rather well defined groups.

Based on the discovery that families of different, but related uncorrected replicas, when corrected by traditional processes, produced nearly identical corrected replicas, the present inventor reasoned that a permanent corrected replica in the nature of a male-forming master, could be constructed and used repeatedly to form final orthotics for each of these identical families. In this way, the substantial amount of labor required to correct each replica of the group of uncorrected replicas which made up the family could be avoided. Continuing studies by the inventor of additional uncorrected replicas received by the laboratory enabled the identification of a large number of identifiable groups of uncorrected replicas which, when corrected, would produce a substantially functionally identical finished orthotic. This information then made it possible to construct a number of forming masters for each of the identified families. After a large inventory of forming masters were then constructed, the next step in the development was to analyze each new uncorrected replica received by the laboratory and identify it with one of the previously identified families of uncorrected replicas which, when corrected, would produce a virtually identical finished orthotic. The forming master associated with the identified family was then used to form the finished orthotic for the newly received uncorrected replica rather than laboriously constructing a corrected replica and using it to form the finished orthotic for the patient.

The approach to making finished orthotics described in the preceding paragraphs was successfully commercialized and the orthotics made by the process were marketed by KLM Laboratories, Inc., of Valencia, Calif., under the name and style "SYSTEM RX". While this novel process was less labor intensive than the traditional prior art process whereby each uncorrected replica was corrected and then used to form the finished orthotic, the many processing difficulties and substantial labor involved in high temperature forming of the orthotic from a selected one of the male-forming molds remained. In a manner presently to be described, the methods of the present invention elegantly avoids the difficult, costly and time consuming step of high temperature forming and finishing of the orthotics from the male-forming masters and produces even a higher quality finished product at a significantly lower cost.

Before discussing the details of the present invention, it should be pointed out that others working in the field have also devised means for reducing the labor costs involved in the hand correction of each of the uncorrected replicas received by the processing laboratory. One such approach is disclosed in U.S. Pat. No. 5,054,148 issued to Grumbine. The Grumbine process involves the use of a computer-controlled mill to produce each individual orthotic from a monolithic workpiece. In accordance with the process, the specific contour of the top and bottom surface of an orthotic for a particular patient is first described and stored in terms of x, y, z coordinates and subsequently formatted such that a particular x, y, z coordinate, i.e. a specific longitudinal and lateral position on a workpiece yields a particular height (z) positioning of the machine tool. The machine tool is then guided along parallel paths through the workpiece while the machine tool's height is automatically adjusted to conform with the desired surface contour.

Although the Grumbine process and other somewhat similar prior art, computer-controlled milling operations developed by others working in the field have proven generally satisfactory, a considerable investment in sophisticated tooling such as scanners, computers and large computer-controlled milling machines is required. In addition, each order requires a unique set up and milling process which increases the overall cost per order.

Another prior art approach to making custom-made shoe inserts is described in U. S. Patent No. 4,876,758 issued to Rolloff et al. This patent discloses a foot impression unit which is provided with an array of gauging elements, a control mechanism for urging the gauging elements into contact with the undersurface of a person's foot to form an impression of the undersurface of the foot and a sensing mechanism for scanning the gauging elements to produce digital signals indicative of the positions of the gauging elements. These digital signals are stored and processed by a computer to provide a stored data record serving as a digital representation of the impression of the undersurface of the foot. The computer may also be employed to provide stored additional information for modifying that data record to compensate for a perceived defect of the foot with the x, y, z information derived. Once again, the custom-made shoe insert is made by a conventional computer controlled milling machine using the stored data for a particular patient. Once again, each order requires expensive and time consuming set-up and milling operations.

As will be better understood from the discussion which follows, the methods of the present invention uniquely overcome most of the drawbacks of the prior art processes for producing orthotics by providing a fast, accurate, efficient, and non-labor intensive process for making high quality precision orthotics in very high volumes.

SUMMARY OF THE INVENTION

By way of brief summary, one form of the method of the present invention for making an injection molded orthotic involves first selecting a multiplicity of uncorrected replicas of the human foot, each of which is to be later modified to create a corrected replica. The contoured lower surface of each uncorrected replica of the multiplicity of uncorrected replicas selected is then analyzed to identify thereon a multiplicity of x, y coordinates. This done, the contoured surface is spaced apart from a reference plane and for each x, y coordinate identified thereon, the distance between the coordinate and the reference plane, that is the z coordinate, is determined and recorded to develop a first set of x, y, z coordinate data. The x, y, z coordinate data thus developed defines the topography of the lower surface of the patient's foot as replicated by the uncorrected replicas which were produced from negative casts taken by the examining doctor of the patient's foot. In an alternate method of the invention, the details of which will later be discussed, the negative casts received from the doctor, rather than the uncorrected replicas, are analyzed to develop the first set of x, y, z data.

Following the correction by traditional methods of the uncorrected replicas, each of the corrected replicas thus formed is used to produce a functional orthotic. Each of the finished orthotics thus produced is then studied to identify those finished orthotics that are substantially functionally identical. The substantially identical finished orthotics are then grouped into a plurality of discreet, finished orthotic groups. Once these groups of finished orthotics are determined and appropriately identified, in accordance with one form of the method of the invention, an injection mold for each family is constructed. In another form of the method of the invention, a compression mold for each family is constructed. The molds for each family is carefully constructed so that the internal cavity of each mold, when used to form a selected material which is placed within the cavity will produce a finished orthotic that is substantially identical to the plurality of finished orthotics which make up the particular group that was identified. By reviewing the recorded data, it can be easily ascertained which uncorrected replicas were used to produce the corrected replicas and which finished orthotics were made from these correct replicas. It follows that each mold can then be identified with the particular group of uncorrected replicas from which the finished orthotic was derived. In this regard, for each group of uncorrected replicas, the x, y, z coordinate data corresponding to that group is identified and recorded and, in this way, a plurality of groups of x, y, z comparison data are developed. Each group of x, y, z comparison data is then identified with a particular mold.

Once each of the molds is associated with a particular comparison group, a newly received uncorrected replica can be analyzed and identified with a particular mold by comparing the x, y, z data of the uncorrected replica with the x, y, z comparison data to determine the group with which it is most closely associated. Once this is done, the proper mold can be selected. Then, using this mold, a precise orthotic can readily be formed for use by the patient. In actual practice, matching of the patient with the proper comparison x, y, z data group is accomplished by first developing x, y, z data for the contoured lower surface of the patient's foot. This patient x, y, z data is then compared with the earlier defined and tabulated comparison group data to identify the particular comparison group within which the patient x, y, z data falls. It is then a simple matter to identify the particular mold which corresponds to the selected group of comparison x, y, z data and to use that mold to form the finished orthotic for the particular patient.

An alternate method of the invention for developing comparison x, y, z data which can be used to select the correct injection or compression mold for a given patient involves the careful analysis of the corrected replicas formed by traditional methods from the uncorrected replicas made using the impression provided by the examining doctor. More particularly, in accordance with this alternate method of the invention, the contoured lower surface of each corrected replica is analyzed to identify thereon a multiplicity of x, y coordinates. This done the contoured surface of the corrected replica is spaced apart from a referred plane and the distance between the reference plane and each of the x, y coordinates is determined and recorded to develop a second set of x, y, z coordinate data. This second set of x, y, z data substantially defines the topography of the lower surface of the corrected replica, and reflects the corrections prescribed by the examining doctor that are believed necessary to properly control the foot functions of the particular patient.

After creating the second set of x, y, z coordinate data, this data is studied to identify those corrected replicas that are substantially identical. This done the substantially identical corrected replicas are grouped into a plurality of discreet, corrected replica families. Once these families of corrected replicas are determined and appropriately identified, a mold for each family is constructed. The mold for each family is carefully constructed so that the internal cavity of the mold will form from a suitable material placed within the cavity a finished orthotic which is substantially identical to the plurality of finished orthotics formed using the particular family of corrected replicas. By reviewing the recorded data, it can be easily ascertained which uncorrected replicas were used to produce the corrected replicas and the finished orthotics made therefrom which make up each family. It follows then that, as before, each mold can be identified with the particular group of uncorrected replicas which, when corrected, produces the finished orthotic that corresponds to the orthotic produced by the particular mold. Once the particular group of uncorrected replicas is identified, the x, y, z, data corresponding to that group is identified and the plurality of groups of comparison x, y, z data can be developed.

With the foregoing in mind, it is a primary object of the present invention to provide a method of making, through use of either an injection mold or a compression mold, a functional orthotic that is a quality equal to or better than that of a functional orthotic made from a corrected replica that is constructed by conventional prior art techniques from an uncorrected replica of the patient's foot.

Another object of the invention is to provide a method of the aforementioned character in which the prescription data typically provided by the examining doctor can be used to quickly and easily identify a particular mold that will produce a finished orthotic that is substantially identical to that which would have been heat formed from a corrected replica of the patient's foot that was made by conventional prior art techniques.

Another object of the invention is to provide a method of making a plurality of specially configured molds which can be used repeatedly to produce high quality, functional orthotics for virtually every type of problem for which functional orthotics are prescribed by an examining doctor.

Another object of the invention is to provide a method as described in the preceding paragraphs in which a definition of the contour of the patient's foot, provided either by means of a negative or positive replica of the patient's foot, or by other contour data obtainable by scanning techniques, or the like, can be used to quickly and easily select the proper mold to be used in making an orthotic for a particular patient.

Still another object of the invention is to provide a method of making precision functional orthotics by either injection molding techniques, compression molding techniques or laminating techniques, which techniques, are considerably more efficient and substantially less labor intensive than presently practiced, prior art techniques.

It is another object of the invention to provide a method of making precision functional orthotics from a variety of materials including moldable plastics, elastomers, cellular foams, graphite and similar materials.

Yet another object of the invention is to provide a method of making precision, high-quality functional orthotics on an as-needed basis from a patient's foot contour data that is on file even in the absence of the original impression of the patient's foot, and in the absence of a corrected replica of the patient's foot.

DISCUSSION OF THE INVENTION

Figure 1:
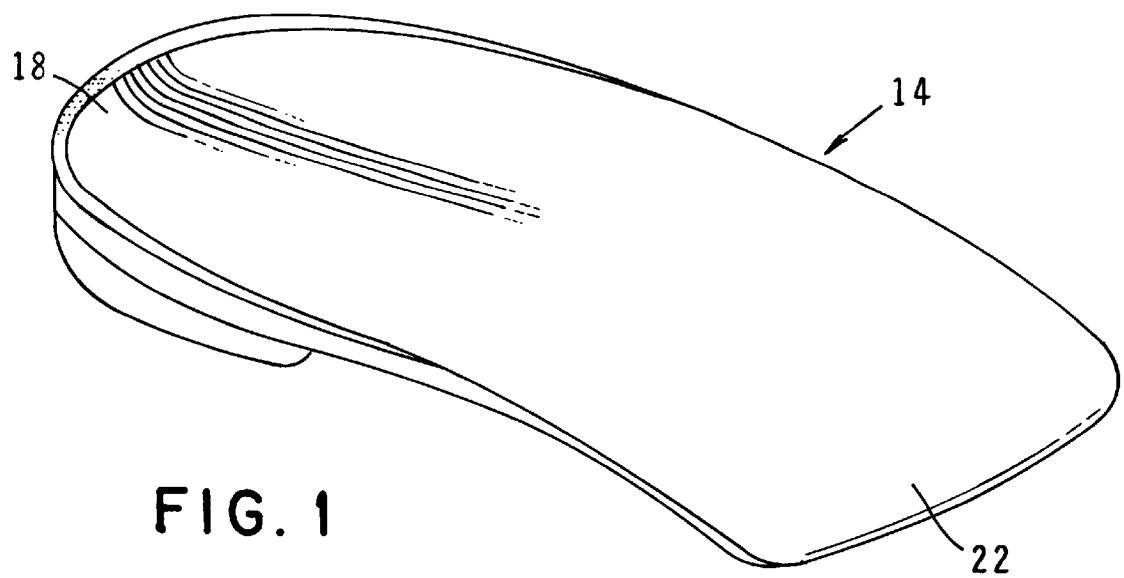
FIG. 1 is a generally perspective view of one form of functional orthotic produced in accordance with the method of the invention.

Referring to the drawings and particularly to FIG. 1, one form of the functional orthotic produced in accordance with the method of the invention is there shown and generally designated by the numeral 14. The three-dimensional, curved supporting surface 16 of the functional orthotic 14 includes the heel region 18 properly contoured to support the users heel, the arch region 20 contoured to properly support the users arch and the metatarsal region 22 disposed proximate the heads of the users metatarsal joints.

As previously discussed, functional orthotics of the type generally illustrated in FIG. 1 are typically produced in accordance with a relatively standard prior art procedure. The first step in this procedure involves the examination of the patient by the doctor and the forming by the doctor of a negative cast of the patient's foot using plaster of paris, crushable foam, or the like (see, for example, FIG. 7). This negative cast is then forwarded to an orthotic laboratory, along with any special instructions the doctor may have concerning the construction of the orthotic for the patient.

At the orthotic laboratory the negative cast is used to make a plaster of paris positive, or uncorrected replica of the patient's foot. The uncorrected replica is then modified by the laboratory in accordance with the doctor's instructions to produce a corrected replica (see, for example, FIG. 3). As previously discussed, the corrections made to the uncorrected replica may include wedging the heel portion by the addition of a plaster platform to simulate the foot in the neutral position. Additionally, the wedged replica may then be further modified with strategically placed plaster of paris buildups to account for fat pad expansion around the heel and along the lateral foot border to allow for compression of the medial arch and transverse arch and to create a smooth transition from the foot platform to the arch and mid-foot.

After the corrected replica is finished to the satisfaction of the laboratory technical staff, a thermoplastic material, such as polypropylene, is heat molded to the plantar surface of the corrected replica. Finally, the formed thermoplastic material is appropriately trimmed and polished to produce the finished functional orthotic having the general physical characteristics of the orthotic illustrated in FIG. 1.

It has long been recognized that the prior art processes of the character described in the preceding paragraphs are somewhat inefficient and highly labor intensive. For this reason, the present inventor began an exhaustive study to attempt to develop an improved and less costly method of making functional orthotics. In this connection, it has always been assumed that each human foot, like a snowflake, is unique, and that each functional orthotic made for a particular patient is similarly unique. With this in mind, the present inventor set out to verify or refute this long-standing belief by carefully analyzing large numbers of human foot impressions provided by the examining doctor and the uncorrected replicas that had been made in the laboratory from these impressions. Next, the inventor studied the corrected replicas that had been produced from the uncorrected replicas and finally, analyzed the functional orthotics that had been made from the corrected replicas. These studies, the details of which will be discussed in the paragraphs which follow, surprisingly revealed that, in actuality, the functional orthotics produced by the prior art process were not individually unique, but rather, could be grouped into families of substantially identical orthotics. More particularly, the present inventor discovered that although there were subtle differences among the three dimensional surfaces exhibited by the finished orthotics, the orthotics could nevertheless be justifiably grouped into some 540 basic configurations and rarely would a selected one of these basic orthotic configurations not be suitable for corrective use by a particular patient. In fact, the study indicates that from these 540 basic configurations, on the order of 60 configurations can produce about 75 percent of the orthotics made by the laboratory on any given day.

Before discussing the methods of the present invention, a brief review of the well-known prior art methods for forming formable materials would perhaps be helpful. As a general rule the shaping of plastic articles and components without the application of pressure is accomplished by casting. The simplest method of shaping articles in conjunction with pressure is by molding which is suitable for both thermosetting and thermoplastic compositions. In one form of molding, known as compression molding, the mold is heated and for impact molding the material itself is preheated. Cold mold compression techniques can also be used to mold plastic materials. Another method of producing molded articles is by injection molding. Materials suitable for injection molding typically include thermoplastics of high fluidity. As a general rule, granules of the material are introduced through a hopper into the cylinder, in which they are heated to above their softening point. A moving piston plasticizes the material and forces it through a nozzle into the mold.

Articles or components can also be shaped by laminating processes. In these processes the starting materials usually in sheet form, are often impregnated with thermosetting compositions such as thermosetting resins. The number of sheets required to give the finished thickness, when compressed, are loaded in a hydraulic press and piled between polished plates which transfer the heat and give their surface finish to the laminated sheet. The sheets are thus compressed and held under pressure while the chemical curing of the resin takes place. When the pressure is removed, the filler sheets are still held in compression by the now converted resin binder and a laminated sheet has been formed.

Still another prior are molding process is a process called cold molding. In the cold molding process, there is generally no provision for heating or chilling the mold. A toggle press which merely compresses the cold molding compound to the finished shape desired is typically used. In this process, the press merely squeezes the material into the proper shape of the mold cavity. These shaped pieces are then removed to ovens for the hardening or curing processes used to "set" an appropriate binder.

In carrying out the several methods of the present invention for producing functional orthotics, various of the prior art molding processes can be used. However, injection molding, compression molding and laminating are particularly well suited for the production of the articles of the invention. These various materials, which are generally characterized herein as "plastics", (that is materials capable of being formed) exhibit different characteristics including different degrees of toughness, flexural strength, tensile strength, color stability, cold flow, heat resistance, heat conduction, flammability, water resistance, acid resistance, solvent resistance, caustic resistance, dimensional change after molding weight per unit volume, hardness, dielectric strength, relative loss factor, resistivity, thermal expansion, odor, taste and cost. A poor rating in one area, such as tensile strength, may have a high rating in another area such as flexural strength. In accordance with the methods of the invention, materials also can be combined to take advantage of strengths and minimize weaknesses to create a hybrid material that hopefully better meets the requirements of specific products.

Following material selection, each type of plastic material must be formed using a selected molding process, either injection molding, compression molding, transfer molding, cold molding, or low pressure laminating. A few materials can be used in more than one process. For example, polypropylene and like plastics can be used in both injection and compression molding.

In any event, the basic thrust of the present invention is to create a defined, finished product or part by the most appropriate process and by using the most appropriate materials for the particular end application. The molding process is chosen to enhance the strengths of the materials (or combinations of materials) and to mute or reduce the effects of weaknesses. Once a particular plastic or combination of plastics is chosen, the mold type can be determined. In any event, the mold must be provided with a cavity that precisely forms the shape of the orthotic as determined in accordance with the various methods discussed hereinafter.

Figure 2:
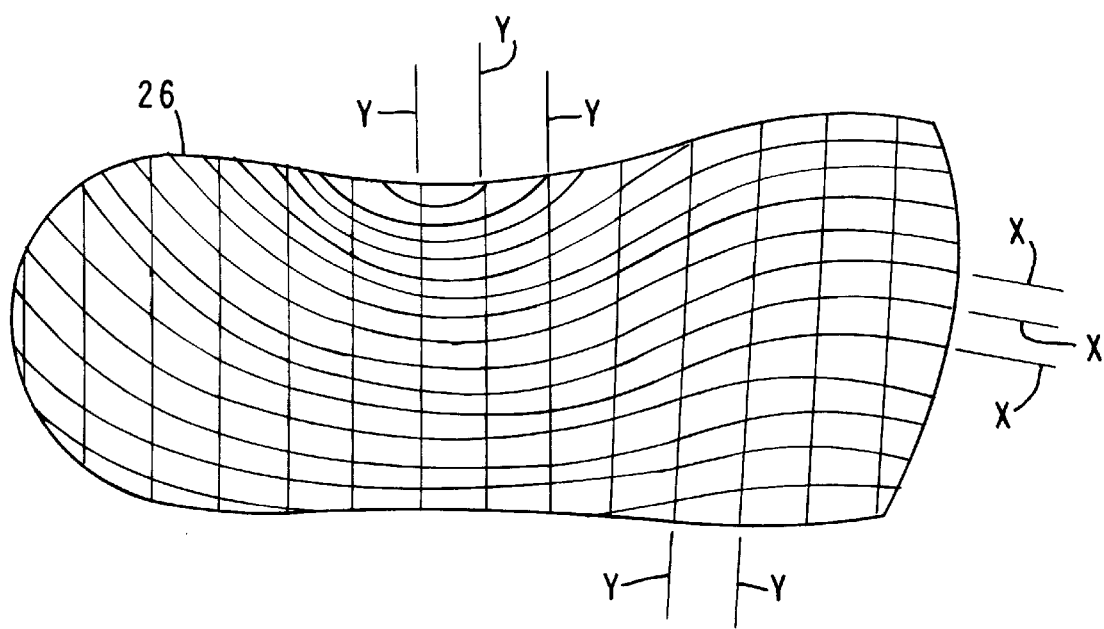
FIG. 2 is a plan view of the lower surface of a corrected replica, which is formed by traditional methods from the uncorrected replica which replicates the lower surface of the foot of the patient. Exemplary x, y coordinates used to identify the surface contour are indicated in the drawing.
Figure 3:
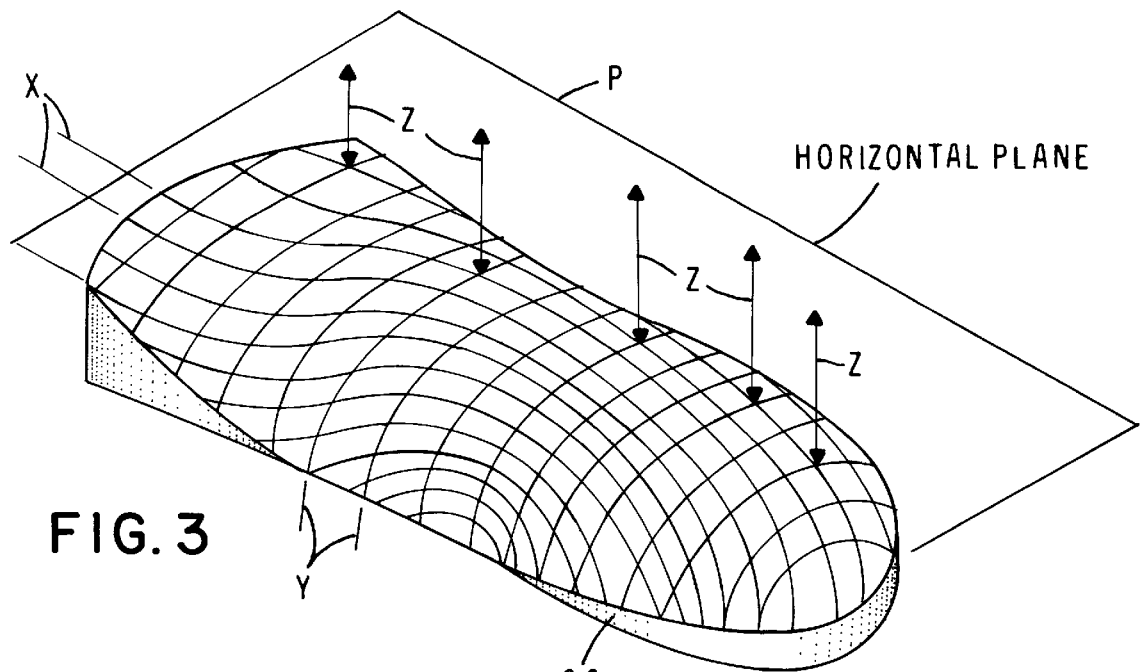
FIG. 3 is a generally perspective view of the corrected replica shown in FIG. 2, the contoured surface of which is spaced apart from a reference plane which is superimposed over the contoured surface and from which z coordinates that represent the distance between the x, y coordinates and the reference plane, can be determined.
Figure 4:
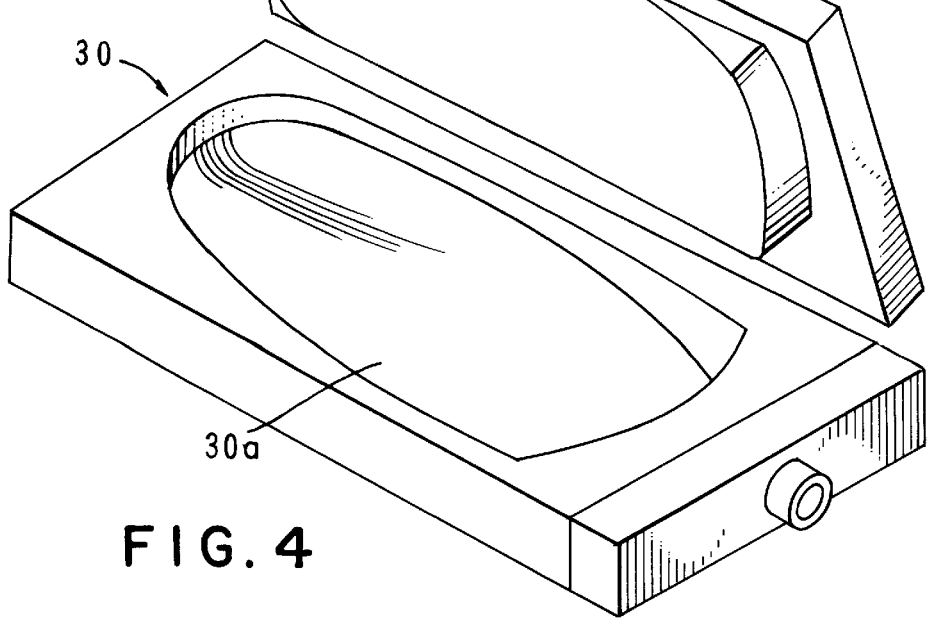
FIG. 4 is an exploded, generally perspective view of one form of injection mold constructed in accordance with the method of the invention.
Figure 5:
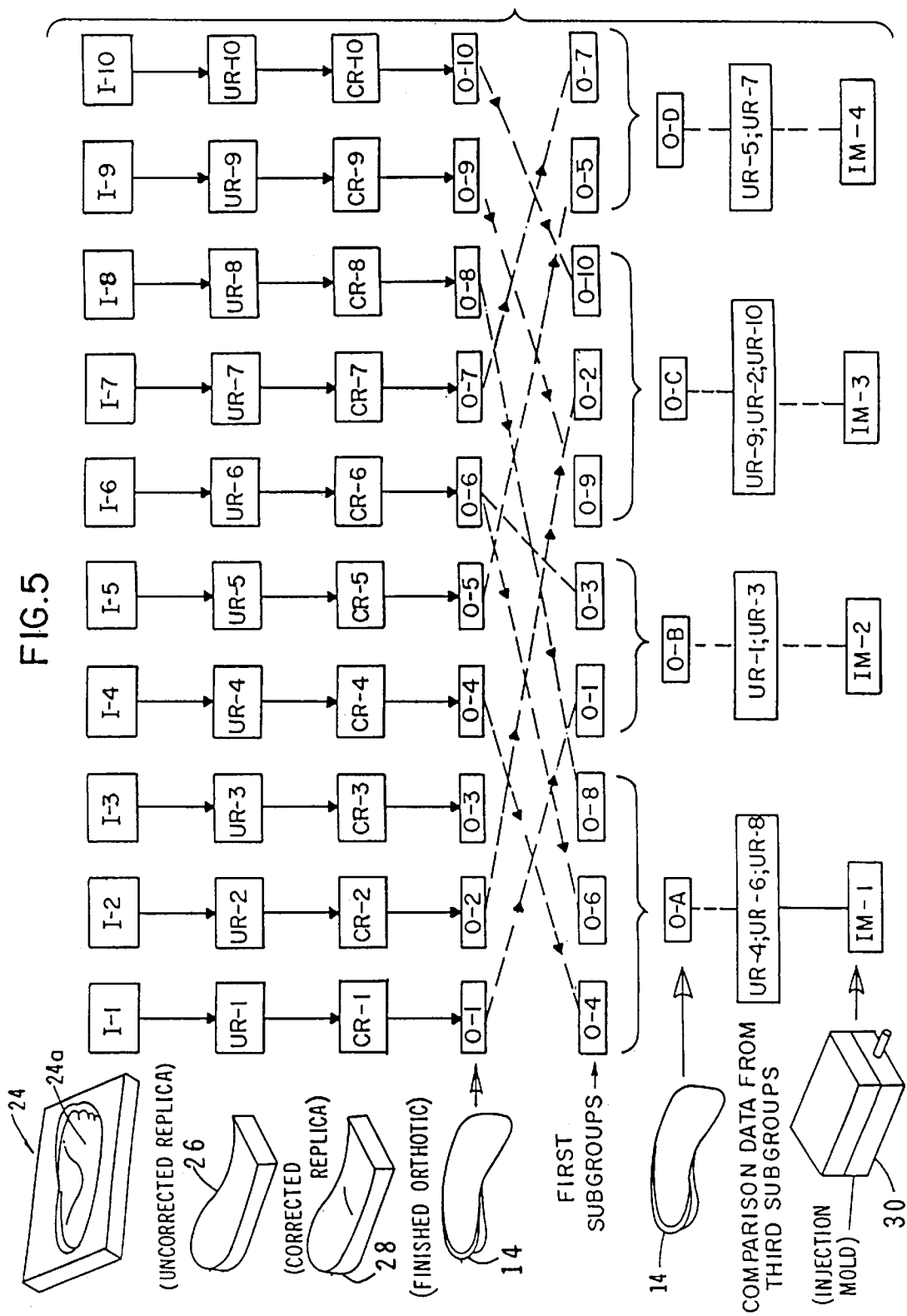
FIG. 5 is a generally diagrammatic representation of the various steps of one form of the method of the invention to produce an injection molded orthotic.
Figure 8:
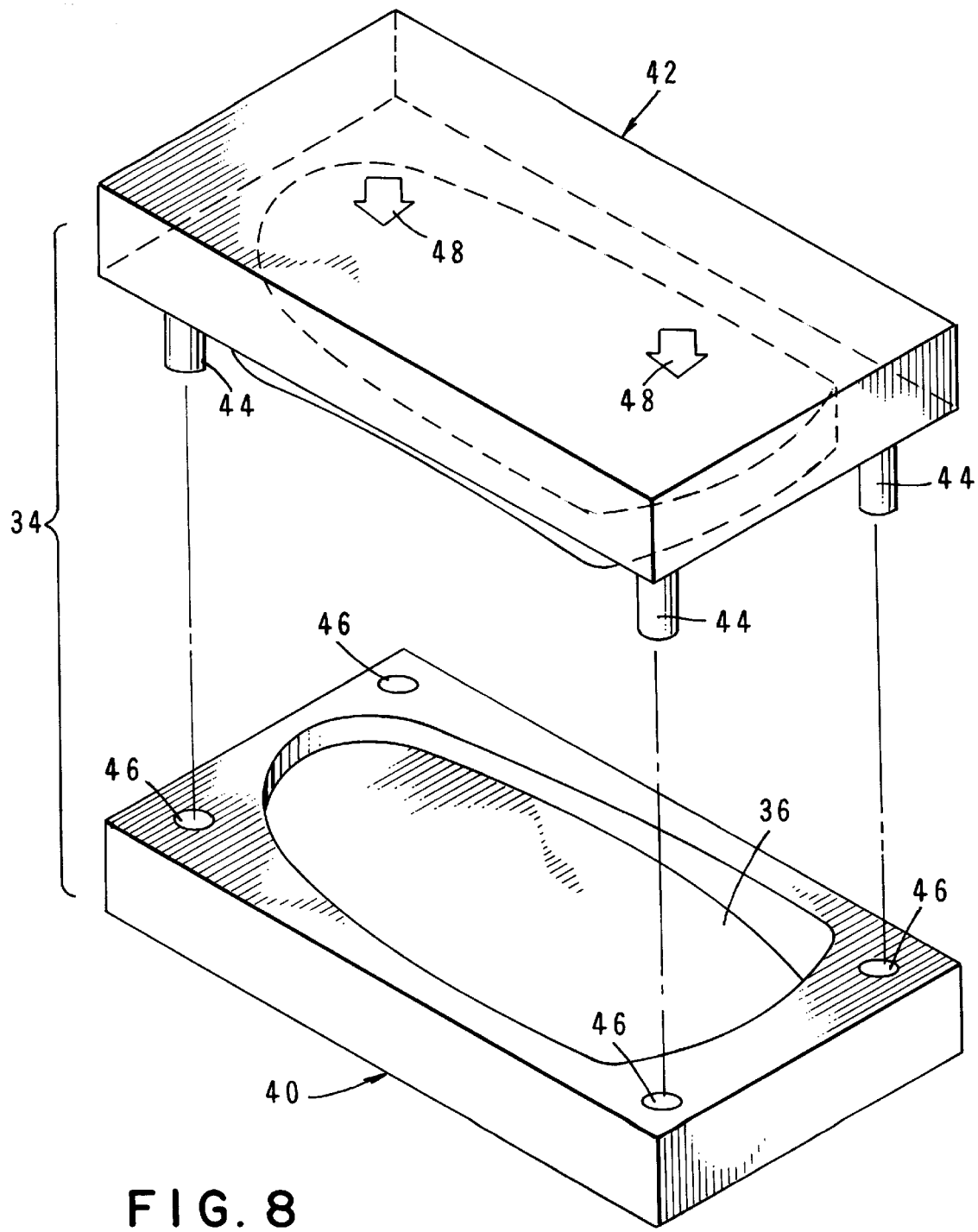
FIG. 8 is a generally perspective, exploded view of one form of compression mold that can be used to form the functional orthotics of the invention.

Turning to FIGS. 2 through 5, one form of the method of the invention for making injection molds, compression molds, or cold molds suitable for use in forming finished orthotics of the general type shown in FIG. 1 is there illustrated (see also FIG. 8). FIG. 2 shows a corrected replica made from an uncorrected replica, which, in turn, was made from a foot impression provided by the examining doctor. FIG. 5 depicts generally the methods of the invention and shows at the left margin of the drawing the progression of the methods, namely selection of the casts or impressions 24, selection of the uncorrected replicas 26 formed from the casts, and then analyzing either the selected corrected replicas 28 made from the uncorrected replicas, or, alternatively, analyzing the selected finished orthotics 14 to derive the coordinates necessary to make the family of molds of the invention. For example, the first step of one form of the method of the invention for making the molds and the finished orthotics involves the selection of a multiplicity of uncorrected replicas of the human foot, such as by way of simplification, replicas UR-1 through UR-10 (FIG. 5) which have been made from the negative casts or impressions I-1 through I-10 received by the laboratory. It is to be understood that, while FIG. 5 shows only ten casts, ten uncorrected replicas, ten corrected replicas and ten finished orthotics, many thousands of casts, replicas and orthotics are in fact analyzed in the accomplishment of the method of the invention, but only ten of each are shown in FIG. 5 in an attempt to simplify the explanation of the process of the invention. While mold 30 in FIG. 5 is identified as an injection mold, it is to be understood that other types of molds such as that shown in FIG. 8 can also be used to form the orthotics of the invention.

Following selection for study of the casts 24, the uncorrected replicas 26 made therefrom and the corrected replicas 28 formed from the uncorrected replicas (FIG. 5), the next step in the method of the invention involves identifying the multiplicity of functional orthotics 14, produced from the corrected replicas, for example, orthotics O-1 through O-10, as identified in FIG. 5 which corrected replicas were made by conventional techniques from the multiplicity of corrected replicas 28, which are identified in FIG. 5 as CR-1 through CR-10. Next, the functional orthotics O-1 through O-10 are carefully examined to identify those which exhibit substantially identical contoured upper, or foot engaging surfaces. This done, a plurality of first subgroups is identified by selecting from the multiplicity of functional orthotics O-1 through O-10 those finished orthotics which are of substantially identical configuration. By way of example, and as illustrated in FIG. 5, orthotics O-4, O-6 and O-8 were grouped into first subgroup O-A, while orthotics O-9, O-2 and O-10 were grouped into first subgroup O-C. This grouping was possible because it was determined that the contoured upper surfaces of orthotics O-4, O-6 and O-8 were substantially identical and that the contoured upper surfaces of orthotics O-9, O-2 and O-10 were also substantially identical. Similarly orthotics O-1 and O-3 were grouped into subgroups O-B and orthotics O-5 and O-7 were grouped into subgroups O-D.

Once subgroups O-A, O-B, O-C and O-D are identified, the final step in one form of the method of the invention for making the injection molds comprises the step of constructing for each of said plurality of subgroups an injection mold 30. As shown in FIG. 4, the several injection molds constructed in accordance with the methods of the invention each have an internal cavity 30a (FIG. 4), which, when filled with a moldable plastic, will produce a finished orthotic having a contoured upper or foot engaging surface which is substantially identical to the contoured upper surfaces of the functional orthotics that make up each of the subgroups, which upper surfaces are formed by pressing a heated thermoplastic blank against a correct replica in the manner previously described herein.

The molds 30 are identified in FIG. 5 as IM-1, IM-2, IM-3 and IM-4. Once the x, y, z data for either the low contoured surface of the corrected replica or the x, y, z data for the upper foot engaging contoured surface of the orthotic for each subgroup is known, the x, y, z data for the bottom shoe engaging surface of the orthotic can similarly be determined by methods well known to those skilled in the art such as by calculation or by using the same measurement techniques previously described for determining the x, y, z data for the contoured surface. Having the x, y, z data for both the upper and lower surfaces of the orthotic, it is a simple matter to construct the injection mold 30 by techniques well understood by to those skilled in the injection molding art.

Referring to FIG. 8, once subgroups O-A, O-B, O-C and O-D have been identified, in the manner described in the preceding paragraphs, the final step in an alternate form of the method of the invention for making the molds to be used in forming the orthotics comprises the step of constructing for each of said plurality of subgroups a compression mold 34. As shown in FIG. 8, the several compression molds constructed in accordance with the methods of the invention each have an internal cavity 36, which, by compressing therewithin a formable plastic, will produce a finished orthotic of the character having a contoured upper or foot engaging surface which is substantially identical to the contoured upper surfaces of the functional orthotics that make up each of the aforementioned subgroups, which upper surfaces are formed by pressing a heated thermoplastic blank against a correct replica in the manner previously described herein.

The mold 34 as illustrated in FIG. 8 includes a base 40 within which cavity 36 is formed and a plunger 42 which, when mated with base 40 in the manner indicated in FIG. 8, captures the formable plastic within cavity 36. Guide pins 44, which are receivable within bore 46, guide pins 44, which are receivable within bores 46, guide plunger 42 into proper mating engagement with base 40. With the mold components mated, a downward pressure such as a pressure exerted by a hydraulic press (not shown) in the direction of the arrows 48 will compressively form the orthotic.

Once the x, y, z data for either the low contoured surface of the corrected replica or the x, y, z data for the upper foot engaging contoured surface of the orthotic for each subgroup is known, the x, y, z data for the bottom shoe engaging surface of the orthotic can similarly be determined by methods well known to those skilled in the art such as by calculation or by using the same measurement techniques previously described for determining the x, y, z data for the contoured surface. Having the x, y, z data for both the upper and lower surfaces of the orthotic, it is a simple matter to construct the compression mold 34 by techniques well understood by to those skilled in the injection molding art.

The methods of the invention for making finished functional orthotics for particular patients using the compression molds developed in the manner described in the preceding paragraphs, obviously involves many of the same steps involved in the methods of the invention for making the compression molds. However, as before, these methods include additional analysis of the information derived during mold development and also include the further important step of generating from the information derived sets of comparison data which can be recorded in comparison tables of x, y, z comparison data. Reference should be made to FIGS. 1 through 5, and the discussion concerning these figures for the techniques involved in developing this important comparison data. As before, after determining the shape of the shoe engaging surface of the particular patient for which the orthotic is to be constructed, this shape can be compared with the sets of comparison data developed to determine which subgroups of foot impressions and uncorrected replicas exhibit contoured surfaces that correspond most closely to the shape of the patients foot. This done, the orthotics formed from the corrected replicas made from the identified uncorrected replicas can be identified. Then it is an easy matter to select the correct compression mold to be used, which, of course, is the mold that will produce the orthotics thus identified.

The derivation of the plurality of sets of comparison data necessary to construct a formed orthotic based on data derived from the examining doctor can be accomplished in several ways. For example, the x, y, z data for the foot impressions which make up each subgroup that corresponds to orthotic subgroups 0-A, 0-B, 0-C, and 0-D can first be determined in the manner illustrated in FIG. 7 of the drawings. Alternatively, the same x, y, z data can be developed in substantially the same manner through analysis of the uncorrected replicas which make up each subgroup that corresponds to the orthotic subgroups 0-A, 0-B, 0-C, and 0-D.

Still another approach to the development of the comparison sets of x, y, z data involves the careful analysis of x, y, z data of the corrected replicas which were made from the uncorrected replicas selected for the study. More particularly, as depicted in FIG. 2, in this particular form of the invention, the lower contoured surface of each of the multiplicity of corrected replicas constructed by the laboratory is analyzed in terms of a multiplicity of x, y coordinates of the general character shown by way of example in FIG. 2. It is to be understood that in actual practice, many more x, y coordinates than those shown in the drawings were identified on the contoured surface of the corrected replicas. However, for sake of clarity of explanation, only a few such coordinates are shown in the drawings. For example, in the actual mapping of the contoured surfaces, of the finished orthotics, the foot impressions, and the corrected replicas, the x or latitude lines are preferably spaced apart by a distance about 1.0 and 1.4 millimeters and the y, or longitude lines, are preferably spaced apart by a distance of between about 0.5 and 0.7 millimeters (see FIGS. 3 and 6).

Figure 3A:
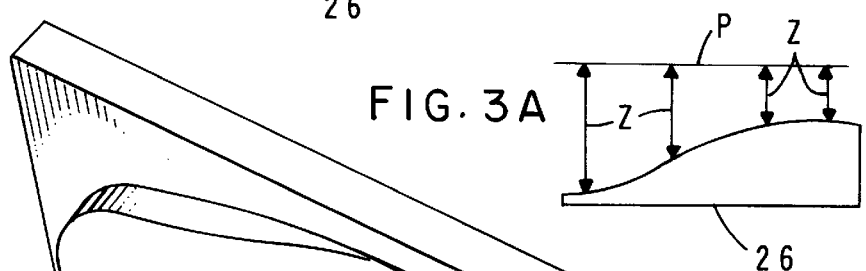
FIG. 3A is a fragmentary, illustrative view of a section of the corrected replica illustrating the manner of determination of the z components of the contoured surface.
Figure 6:
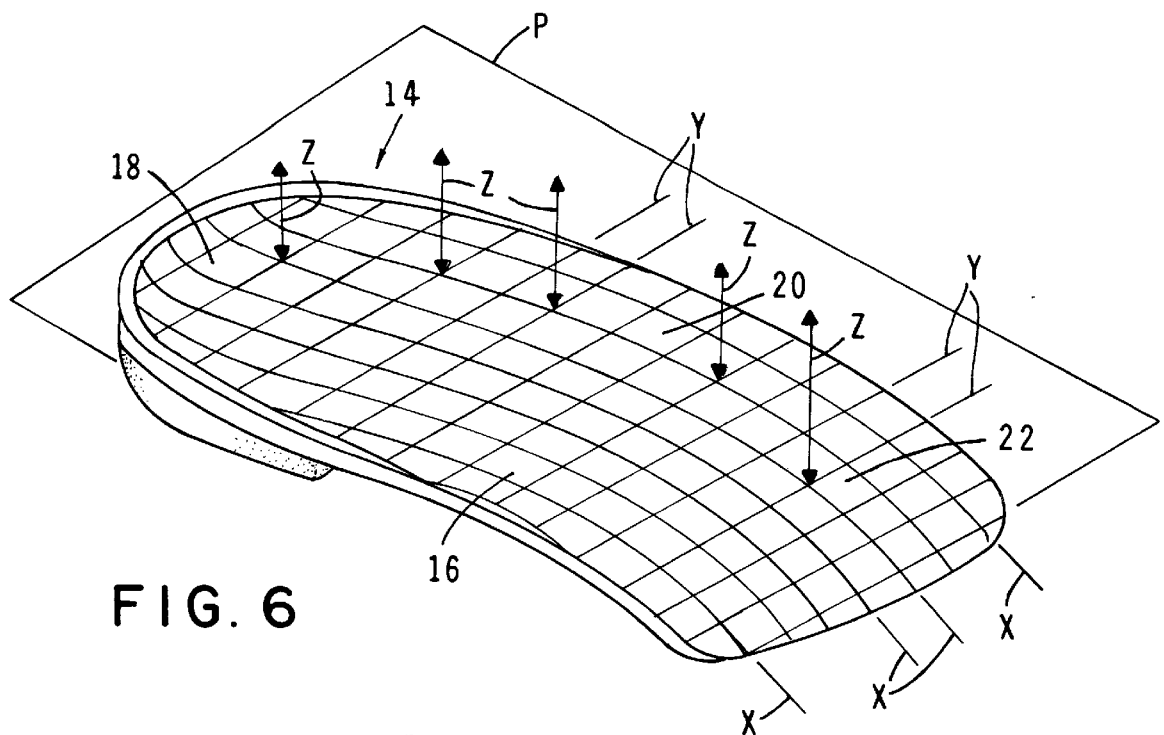
FIG. 6 is a generally perspective view of the orthotic shown in FIG. 1, the contoured surface of which is spaced apart from a reference plane which is superimposed over the contoured surface and from which z coordinates that represent the distance between the x, y coordinates and the reference plane, can be determined.
Figure 7:
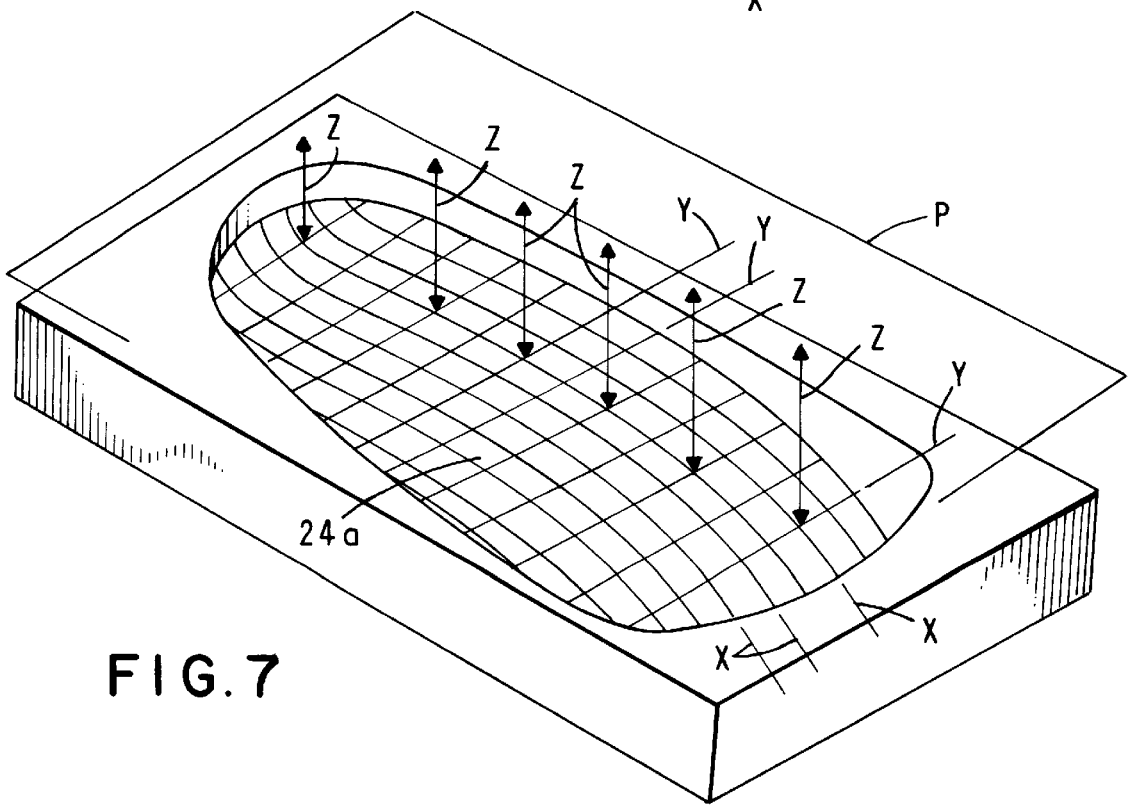
FIG. 7 is a generally perspective view of a foot impression of the character received from the examining doctor, the contoured surface of which is spaced apart from a reference plane which is superimposed over the contoured surface thereof and from which z coordinates that represent the distance between the x, y coordinates and the reference plane, can be determined.

After the x, y coordinates are defined, the foot impressions 24, uncorrected replica 26, or the finished orthotic 14, as the case may be, is positioned at a spaced-apart location from a reference plane "P" which is typically perpendicular to the bisection of the calcaneus in the manner depicted in FIGS. 3, 6, and 7. This done, the previously discussed z coordinates are determined. The z coordinates represent the distance between the reference plane "P" and each of the multiplicity of points on the contoured surface which are defined by the intersection of the coordinate x, y lines (see also FIG. 3A). The z coordinates can be identified in a number of ways well known to those skilled in the art. For example, conventional inspection techniques using surface plates and dial gages can be used. Additionally, impression units such as described in the previously mentioned prior art patent to Rolloff et al, U.S. Pat. No. 4,876,758 can be used in conjunction with a suitable computer and computer software to produce digital signals representative of the contoured surface under consideration. Similarly, the contoured surfaces can be scanned directly using computer assisted scanning devices such as, for example, a laser digitizer of a character which is readily commercially available from sources such as Cyberware Company of Pacific Grove, Calif.

Considering particularly the method of the invention which involves the mapping of the contoured surface of the multiplicity of corrected replicas CR-1 through CR-n, particular reference should be made to FIGS. 2, 3, 3A and 5. As is shown in FIG. 5, corrected replicas are constructed from the multiplicity of uncorrected replicas UR-1 through UR-n, which, in turn were formed from impressions I-1 through I-n. As was the case in accomplishing the method of the invention for making the molds, the multiplicity of corrected replicas CR-1 through CR-n are first divided into subgroups wherein each corrected replica of a particular subgroup exhibits a substantially identical lower contoured surface. If the orthotics of the first orthotic subgroup, as for example those of orthotic subgroup 0-A (see FIG. 5), are then associated with the corrected replicas from which they were formed, the resulting corrected replica subgroup would consist of corrected replicas CR-4, CR-6 and CR-8. Similarly, the corrected replicas associated with orthotic subgroup 0-B would consist of corrected replicas CR-1 and CR-3. In a similar fashion, the corrected replica subgroups associated with orthotic subgroups 0-C and O-D can readily be determined.

Once the corrected replica or second subgroups are thus identified, it is then possible to identify a plurality of third subgroups by identifying for each third subgroup the uncorrected replicas UR-1 through UR-n which were corrected to form the corrected replicas which make up the second subgroup. For example, the third subgroup of uncorrected replicas associated with the second subgroup of corrected replicas comprising CR-4, CR-6 and CR-8 consist of uncorrected replicas UR-4, UR-6 and UR-8. Similarly, the third subgroup of uncorrected replicas associated with corrected replicas CR-1 and CR-3 consist of uncorrected replicas UR-1 and UR-3.

Using the x, y, z data derived in the manner discussed in the preceding paragraphs, the comparison tables of the invention can readily be developed. As previously discussed, these important comparison tables are used to select a particular mold for a particular patient based upon the particular shape of the lower shoe engaging surface of the patient's foot. In actually formulating the comparison tables, the x, y, z data previously developed for each of the multiplicity of corrected replicas or finished orthotics is analyzed and correlated with the appropriate uncorrected replica subgroup. For example, as indicated in FIG. 5, a first set of x, y, z comparison data might consist of the x, y, z coordinate data for corrected replicas CR-4, CR-6 and CR-8. Similarly, a second set of x, y, z data might consist of the x, y, z coordinate data from corrected replicas CR-1 and CR-3 and so on.

For each of the sets of corrected replica comparison x, y, z data thus developed, the mold which is associated with that set is identified. For example, as is evident from FIG. 5, the mold 30 which is associated with the first set of corrected replica comparison x, y, z data is designated as IM-1. Similarly, the mold 30 which is associated with the second set of corrected replica comparison x, y, z data is designated as IM-2 and so on. It is also apparent from a study of FIG. 5 that the corrected replicas CR-4, CR-6 and CR-8 were constructed from uncorrected replicas UR-4, UR-6 and UR-8, which, in turn, were formed from foot impressions or casts I-4, I-6 and I-8 With the foregoing analysis in mind, in carrying out one form of the method of the invention, for making a finished orthotic, when the prescription for a particular patient is received from the examining doctor, the correct mold for producing the orthotic for the new patient can be quickly identified in the following manner. First, from the prescription data received, which may include an impression of the patient's foot, the x, y, z data for contoured lower surface of the patient's foot is determined in the manner illustrated in FIG. 7. This patient's x, y, z data is then compared with the groups of x, y, z data found in the comparison table to identify the particular group within which the patient x, y, z data falls. Once this is done, the mold which corresponds to the selected comparison group of x, y, z data is identified, and, using the selected mold, the finished orthotic for the patient is then formed.

It is to be understood that, as previously discussed, the patient x, y, z data can be determined in a number of ways. For example, as indicated in FIG. 7, physical measurements of the impression received from the examining doctor can be used to identify the contour of the shoe engaging portion of the patient's foot. In accordance with this method, x, y coordinates are first identified on the surface of the cavity 24a of the impression (FIG. 7). This done, the z coordinates, which are the distances between a reference plane "P" spaced apart from cavity 24a and the points defined by the intersection of the x-y lines, are determined. These z coordinates can be determined in a number of ways well known in the art such as, for example, through use of a depth gage, by electronic scanning or by using mechanical impression units of the general type described in U.S. Pat. No. 4,876, 758. After this x, y, z data is obtained and recorded, it can be correlated in the manner shown in FIG. 5 with the uncorrected and corrected replicas which evolve from the impressions and, finally with the first subgroups of orthotics produced from the corrected replicas. The multiplicity of sets of comparison data which make up the comparison tables can then be derived in the manner previously discussed and then used to select the correct injection mold for molding a finished orthotic for a given patient from which the patient x, y, z data has been determined.

Alternatively, the equipment and techniques described in U.S. Pat. No. 4,876,758 issued to Rolloff et al can be used to measure the mold cavity. Further, mechanical or electronic scanning of the uncorrected replicas made from the foot impressions can be accomplished, or the patient's feet themselves can be analyzed by techniques well known to those skilled in the art to determine the foot contour. In any event, once the patient x, y, z data is derived by any one of the aforementioned methods, it can quickly be compared with the comparison data tables and the proper mold 30 selected from the multiplicity of some five hundred and forty or more molds which have been constructed, identified and cataloged in accordance with the previously described methods of the invention.

It is to be understood that mold assemblies such as that shown in FIG. 8 can be used for conventional hot or cold compression molding in accordance with techniques well known to those skilled in the art. Similarly mold bases such as base 40 having cavity 36 can be used to form orthotics by a laminating process of a character well understood by those skilled in the art.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method of making molds for use in forming orthotics comprising the steps of:
   (a) selecting a multiplicity of corrected replicas of the human foot, each having been made from an uncorrected replica of the human foot having an uncorrected contoured lower surface, each said corrected replica exhibiting a corrected contoured lower surface from which an orthotic can be formed by heating and pressing a thermoplastic blank thereagainst;
   (b) examining each said corrected replica of said selected multiplicity of corrected replicas to identify those having substantially identical contoured lower surfaces;
   (c) identifying a plurality of corrected replica subgroups by grouping said multiplicity of corrected replicas which were examined into subgroups in which said corrected replicas which make up each said subgroup exhibit substantially identical contoured lower surfaces; and
   (d) constructing for each of said plurality of subgroups a mold having an internal cavity which will produce from a formable material placed in said internal cavity a finished orthotic having a contoured upper surface substantially identical to the contoured lower surfaces of said corrected replicas which make up each said subgroup.

2. A method as defined in claim 1, including the further step of generating x, y, z data for a selected one of the corrected replicas which make up each said corrected replica subgroup to form a plurality of sets of comparison x, y, z data, comprising the steps of:
   (a) identifying on the contoured lower surface of each said selected corrected replica a multiplicity of x, y coordinates;
   (b) for each said selected corrected replica, defining a plane spanning said contoured lower surface thereof and spaced apart therefrom; and
   (c) for each said selected corrected replica, determining and recording for each x, y coordinate identified thereon the distance between the coordinate and said plane, whereby for each said injection mold constructed, a set of x, y, z data can be assigned thereto, said set of x, y, z data defining the contour of the lower surface of the corrected replicas which make up the corrected replica subgroup for which the mold was constructed.

3. A method as defined in claim 2 in which:
   (a) said x coordinates are identified on the said lower surface of each said selected corrected replica in a manner such that each said x coordinate is spaced from the adjacent x coordinate by a distance of between about 1.0 and about 1.4 millimeters; and
   (b) said y coordinates are identified on said lower surface of each said selected corrected replica in a manner such that each said y coordinate is spaced from the adjacent y coordinate by a distance of between about 0.5 millimeters and about 0.9 millimeters.

4. A method as defined in claim 2 comprising the further step of identifying said uncorrected replicas from which each said group of corrected replicas was constructed to form a plurality of uncorrected replica groups and for each said plurality of said uncorrected replica groups selecting an uncorrected replica and then for each said selected uncorrected replica:
   (a) identifying on the contoured lower surface thereof a multiplicity of x, y coordinates;
   (b) for each said selected uncorrected replica, defining a plane spanning said contoured lower surface thereof and spaced apart therefrom; and
   (c) for each said selected uncorrected replica, determining and recording for each x, y coordinate identified thereon the distance between the coordinate and said plane.

5. A method as defined in claim 4 in which said uncorrected replicas were made from impressions of the human foot and in which the method comprises the further step of identifying the impressions of the human foot from which each said group of corrected replicas was constructed to form a plurality of foot impression groups and for each said plurality of foot impression groups selecting foot impression and then for each said elected foot impression:
   (a) identifying thereon a multiplicity of x, y coordinates;
   (b) for each said selected foot impression defining a base plane spanning said foot impression and being spaced apart therefrom; and
   (c) for each said selected foot impression, determining and recording for each x, y coordinate identified thereon the distance between the coordinate and the base plane.

6. A method of making molds for use in forming orthotics from formable materials comprising the steps of:
   (a) selecting a multiplicity of orthotics made from a multiplicity of corrected replicas, said corrected replicas having been made from uncorrected replicas having a lower contoured surface substantially replicating the shoe-engaging surface of the human foot;
   (b) examining each said orthotic of said multiplicity of selected orthotics to identify those having substantially identical contoured upper surfaces;
   (c) identifying a plurality of orthotic subgroups by dividing said orthotics examined into subgroups in which said finished orthotics which make up each said subgroup exhibit substantially identical contoured upper surfaces; and
   (d) constructing for each of said plurality of subgroups a mold having an internal cavity which will produce from a formable material a finished orthotic having a contoured upper surface substantially identical to the contoured upper surface of said orthotics which make up each said subgroup.

7. A method as defined in claim 6, including the further step of generating x, y, z data, for a selected one of said orthotics which make up each said orthotic subgroup to form a plurality of sets of comparison x, y, z data, comprising the steps of:
   (a) identifying on the contoured upper surface of each said selected functional orthotic a multiplicity of x, y coordinates;
   (b) for each said selected functional orthotic defining a plane spanning said contoured upper surface thereof and spaced apart therefrom; and (c) for each said selected functional orthotic determining and recording for each x, y coordinate identified thereon the distance between the coordinate and said plane, whereby for each said injection mold made, a set of x, y, z data can be assigned thereto, said set of x, y, z data defining the contour of the upper surface of the functional orthotics which make up the functional orthotic subgroup for which the mold was constructed.

8. A method as defined in claim 6 comprising the further step of identifying said corrected replicas from which each said group of orthotics was constructed to form a plurality of corrected replica subgroups and for each said plurality of said corrected replica subgroups selecting a corrected replica and then for each said selected corrected replica:
   (a) identifying on the contoured lower surface thereof a multiplicity of x, y coordinates;
   (b) for each said selected corrected replica, defining a plane spanning said contoured lower surface thereof and spaced apart therefrom; and
   (c) for each said selected corrected replica, determining and recording for each x, y coordinate identified thereon the distance between the coordinate and said plane.

9. A method as defined in claim 8 comprising the further step of identifying the uncorrected replicas from which each said group of corrected replicas was constructed to form a plurality of uncorrected replica subgroups and for each said plurality of said uncorrected replica groups selecting an uncorrected replica and then for each said selected uncorrected replica:
   (a) identifying on the contoured lower surface thereof a multiplicity of x, y coordinates;
   (b) for each said selected uncorrected replica, defining a plane spanning said contoured lower surface thereof and spaced apart therefrom; and
   (c) for each said selected uncorrected replica, determining and recording for each x, y coordinate identified thereon the distance between the coordinate and said plane.

10. A method as defined in claim 9 in which said uncorrected replicas were made from impressions of the human foot and comprising the further step of identifying the impressions of the human foot from which each said subgroup of corrected replicas was constructed to form a plurality of foot impression groups and for each said plurality of foot impression subgroups selecting foot impression and then for each said selected foot impression:
   (a) identifying thereon a multiplicity of x, y coordinates;
   (b) for each said selected foot impression defining a base plane spanning said foot impression and being spaced apart therefrom; and
   (c) for each said selected foot impression, determining and recording for each x, y coordinate identified thereon the distance between the coordinate and the base plane.

11. A method of making molds for use in forming orthotics comprising the steps of:
   (a) selecting a multiplicity of uncorrected replicas of the human foot, each having an uncorrected contoured lower surface and each of which is later to be corrected to form a corrected replica having a corrected contoured surface from which an orthotic can be made;
   (b) identifying a multiplicity of corrected replicas made from said multiplicity of uncorrected replicas;
   (c) identifying the multiplicity of orthotics made from said multiplicity of corrected replicas;
   (d) examining each said orthotic of said multiplicity of orthotics to identify those having substantially identical contoured upper surfaces;
   (e) identifying a plurality of first subgroups of orthotics by dividing said multiplicity of orthotics examined into subgroups in which said finished orthotics which make up each said subgroup exhibit substantially identical contoured upper surfaces; and
   (f) constructing for each of said plurality of first subgroups a mold having an internal cavity which will produce from a formable material a finished orthotic having a contoured upper surface substantially identical to the contoured upper surface of said orthotics which make up each said subgroup.

12. A method as defined in claim 11, including the further step of generating a comparison set of x, y, z data, comprising the steps of:
   (a) identifying a plurality of second subgroups by dividing said multiplicity of corrected replicas into second subgroups in which said corrected replicas which make up each said second subgroup exhibit substantially identical lower contoured surfaces;
   (b) identifying a plurality of third subgroups by identifying for each said second subgroup the uncorrected replicas which were corrected to form said corrected replicas which make up said second subgroup;
   (c) for each said uncorrected replica of each of said plurality of third subgroups:
      (i) identifying on the contoured lower surface thereof a multiplicity of x, y coordinates;
      (ii) defining a plane spanning said contoured lower surface and spaced apart therefrom; and
      (iii) determining and recording for each x, y coordinate identified on each said uncorrected replica of said third subgroups the distance between the coordinate and said plane.

13. A method as defined in claim 12 in which said uncorrected replicas were made from a multiplicity of impressions of the human foot and including the further step of identifying the impressions of the human foot from which each said group of uncorrected replicas was constructed to form a plurality of foot impression subgroups.

14. A method as defined in claim 13, including the further step of selecting from each said foot impression subgroup an individual foot impression and then for each said selected individual foot impression:
   (a) identifying thereon a multiplicity of x, y coordinates;
   (b) for each said selected individual foot impression, defining a base plane spanning said contoured surface and spaced apart therefrom; and
   (c) for each said selected individual foot impression determining and recording for each y, y coordinate identified on each said selected individual foot impression the distance between the coordinate and the base plane.

15. A method of making molds for use in forming functional orthotics from a formable material comprising the steps of:
   (a) selecting a multiplicity of impressions of the human foot, each having a cavity having a contoured surface which cavity is later to be used to form an uncorrected replica which, in turn, is later to be corrected to form a corrected replica having a corrected contoured surface from which an orthotic can be formed;
   (b) identifying the functional orthotics made from said corrected replicas;

(c) examining said functional orthotics to identify those having substantially identical contoured upper surfaces;

(d) identifying a plurality of first subgroups by dividing said functional orthotics examined into subgroups in which said finished orthotics which make up each said subgroup exhibit substantially identical contoured upper surfaces; and (e) constructing for each of said plurality of subgroups a mold having an internal cavity which will produce from a formable material placed within said cavity a finished functional orthotic having a contoured upper surface substantially identical to the contoured upper surfaces of said functional orthotics which make up each said subgroup.

16. A method as defined in claim 15 including the further step of generating a set of x, y, z comparison data, comprising the steps of:

(a) identifying a plurality of second subgroups by dividing the corrected replicas into second subgroups in which said corrected replicas which make up each said second subgroup exhibit substantially identical lower contoured surfaces;

(b) identifying a plurality of third subgroups by identifying for each said second subgroup the uncorrected replicas which were corrected to form said corrected replicas which make up said second subgroup;

(c) identifying a plurality of subgroups of foot impressions by identifying for each subgroup the foot impressions used to form said uncorrected replicas which make up said third subgroup;

(d) for each said foot impression of each of said plurality of foot impression subgroups:

(i) identifying on the contoured surface of the cavity thereof a multiplicity of x, y coordinates;

(ii) defining a plane spanning said contoured surface and spaced apart therefrom; and (iii) determining and recording for each x, y coordinate identified on said contoured surface the distance between the coordinate and said plane.

17. A method of making an orthotic for use by a patient having a foot exhibiting a contoured shoe-engaging surface comprising the steps of:

(a) selecting a multiplicity of orthotics made from a multiplicity of corrected replicas, said corrected replicas having been made from uncorrected replicas having a lower contoured surface substantially replicating the shoe-engaging surface of the human foot;

(b) examining each said orthotic of said multiplicity of selected orthotics to identify those having substantially identical contoured upper surfaces;

(c) identifying a plurality of orthotic subgroups by dividing said orthotics examined into subgroups in which said finished orthotics which make up each said subgroup exhibit substantially identical contoured upper surfaces;

(d) constructing for each of said plurality of subgroups a compression mold having an internal cavity which will produce a finished orthotic having a contoured upper surface substantially identical to the contoured upper surface of said orthotics which make up each said subgroup;

(e) formulating a plurality of sets of comparison data by determining for each of said orthotic subgroups the shape of the contour of the contoured surfaces of the foot impressions and uncorrected replicas which were used to construct the corrected replicas which, in turn, were used to form the orthotics which make up each of said orthotic subgroups;

(f) determining the shape of the contour of the shoe-engaging surface of the patient's foot;

(g) comparing said shape of the contour of the shoe-engaging surface of the patient's foot thus determined with said sets of comparison data to identify the particular set of comparison data that defines the shape of the contoured surfaces of said foot impression and uncorrected replicas that most nearly correspond to said shape of the contour of the shoe-engaging surface of the patient's foot;

(h) identifying said orthotic subgroup which consists of orthotics formed from the corrected replicas made from the uncorrected replicas which exhibit a contoured surface shape that corresponds to the shapes defined in the identified set of comparison data;

(i) selecting the compression mold constructed for said identified orthotic subgroup; and (j) molding from said selected mold a finished orthotic for the patient.

18. A method as defined in claim 17 in which the shape of the contour of the contoured surfaces of said foot impressions was determined for each said foot impression by a method comprising the steps of:

(a) identifying on said contoured surface a multiplicity of x, y coordinates;

(b) defining a base plane spanning said foot impression and being spaced apart therefrom; and (c) determining and recording for each x, y coordinate identified thereon the distance between the coordinate and the base plane.

19. A method as defined in claim 17 in which the shape of the contoured surfaces of said uncorrected replicas was determined for each said uncorrected replica by a method comprising the steps of:

(a) identifying on said contoured surface a multiplicity of x, y coordinates;

(b) defining a base plane spanning said contoured surface of said uncorrected replica and being spaced apart therefrom; and (c) determining and recording for each x, y coordinate identified thereon the distance between the coordinate and the base plane.

20. A method of making an orthotic for use by a patient having a foot exhibiting a contoured shoe-engaging surface comprising the steps of:

(a) selecting a multiplicity of corrected replicas of the human foot, each having been made from an uncorrected replica of a human foot having an uncorrected contoured lower surface, each said corrected replica exhibiting a corrected contoured lower surface from which an orthotic could be formed by heating and pressing a thermoplastic blank thereagainst;

(b) examining each said corrected replica of said selected multiplicity of corrected replicas to identify those having substantially identical contoured lower surfaces;

(c) identifying a plurality of corrected replica subgroups by grouping said multiplicity of corrected replicas which were examined into subgroups in which said corrected replicas which make up each said subgroup exhibit substantially identical contoured lower surfaces;

(d) constructing for each of said plurality of subgroups a mold having an internal cavity which, when filled with a material, will produce a finished orthotic having a contoured upper surface substantially identical to the contoured lower surfaces of said corrected replicas which make up each said subgroup;

(e) formulating a plurality of sets of comparison data by determining for each of said corrected replica subgroups the shape of the contour of the contoured surfaces of the foot impressions and uncorrected replicas which were used to construct the corrected replicas which make up each of said corrected replica subgroups;

(f) determining the contour of the shoe-engaging surface of the patient's foot;

(g) comparing said contour of the shoe-engaging surface of the patient's foot thus determined with said sets of comparison data to identify the particular set of comparison data that defines the shape of the contoured surfaces of said foot impression and uncorrected replicas that most nearly corresponds to said shape of the contour of the shoe-engaging surface of the patient's foot;

(h) identifying the corrected replica subgroup which consists of corrected replicas constructed using the uncorrected replicas which exhibit a contoured surface shape that corresponds to the shapes defined in the identified set of comparison data;

(i) selecting said mold constructed for said identified corrected replica subgroup; and (j) molding from said selected mold a finished orthotic for the patient.

21. A method as defined in claim 20 in which the shape of the contour of the contoured surfaces of said foot impressions was determined for each said foot impression by a method comprising the steps of:

(a) identifying on said contoured surface a multiplicity of x, y coordinates;

(b) defining a base plane spanning said foot impression and being spaced apart therefrom; and (c) determining and recording for each x, y coordinate identified thereon the distance between the coordinate and the base plane.

22. A method as defined in claim 20 in which the shape of the contoured surfaces of said uncorrected replicas was determined for each said uncorrected replica by a method comprising the steps of:

(a) identifying on said contoured surface a multiplicity of x, y coordinates;

(b) defining a base plane spanning said contoured surface of said uncorrected replica and being spaced apart therefrom; and (c) determining and recording for each x, y coordinate identified thereon the distance between the coordinate and the base plane.

23. A method of making an orthotic for use by a patient having a foot exhibiting a contoured lower surface comprising the steps of:

(a) selecting a multiplicity of replicas of the human foot, each of which is later to be used to form by conventional techniques a corrected replica having a corrected contoured surface from which an orthotic can be formed;

(b) selecting a multiplicity of corrected replicas from those made from said multiplicity of selected replicas of the human foot;

(c) selecting a multiplicity of functional orthotics from those made from said multiplicity of selected corrected replicas;

(d) identifying a plurality of first subgroups by examining each said functional orthotic of said multiplicity of functional orthotics selected to identify those functional orthotics having a substantially identical contoured upper surface;

(e) producing a multiplicity of molds by constructing for each of said plurality of first subgroups a mold having an internal cavity which, when filled with a flowable material, will produce a finished orthotic having a contoured upper surface substantially identical to the contoured upper surface of said functional orthotics which make up each said subgroup;

(f) identifying a plurality of second subgroups by dividing said multiplicity of corrected replicas selected into second subgroups in which said corrected replicas which make up such said second subgroup exhibit substantially identical lower contoured surfaces;

(g) identifying a plurality of third subgroups by identifying for each said second subgroup the uncorrected replicas which were corrected to form said corrected replicas which make up said second subgroup;

(h) producing a first set of comparison data by analyzing said plurality of said third subgroups of uncorrected replicas and for each said uncorrected replica of each of said plurality of said third subgroups:

(i) identifying on the contoured lower surface thereof a multiplicity of x, y coordinates;

(ii) defining a reference plane spanning said contoured lower surface and spaced apart therefrom;

(iii) determining and recording for each x, y coordinate identified on each said uncorrected replica of said third subgroups the distance between the coordinate and said reference plane;

(i) determining and recording x, y, z data for the contoured lower surface of the patient's foot by determining, for each of a multiplicity of x, y coordinates defined on said contoured lower surface thereof, the height of the coordinate above a reference plane to develop patient x, y, z data;

(j) comparing said patient x, y, z data with said comparison groups of x, y, z data to identify the comparison group of x, y, z data within which said patient x, y, z data falls;

(k) selecting said injection mold which corresponds to said selected comparison group of x, y, z data; and (l) producing from said selected mold the finished orthotic.

24. A method as defined in claim 23 in which the multiplicity of replicas of the human foot selected comprise impressions of the human foot made by the examining doctor.

* * * * *